May 10, 1949.                    H. C. RENTSCHLER                    2,469,410
                                   ULTRAVIOLET LAMP
                                  Filed Feb. 5, 1945
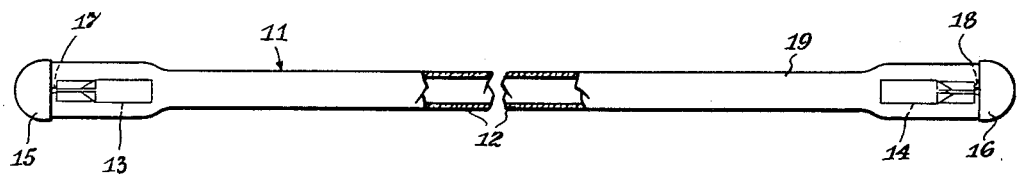
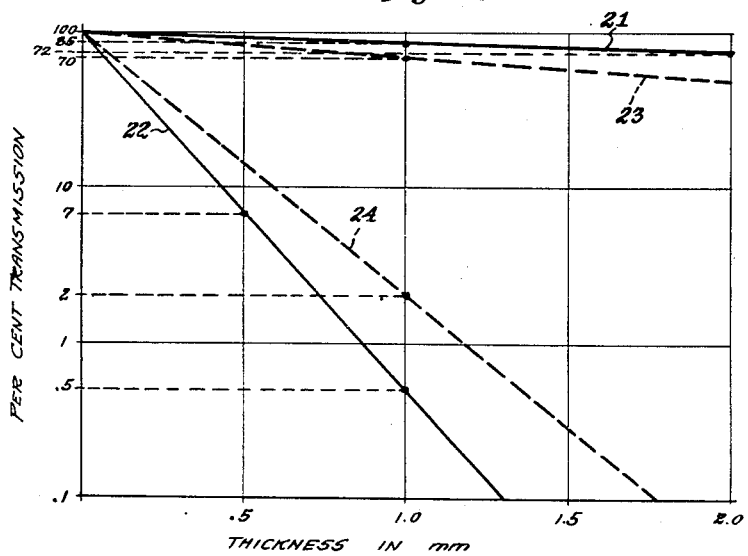
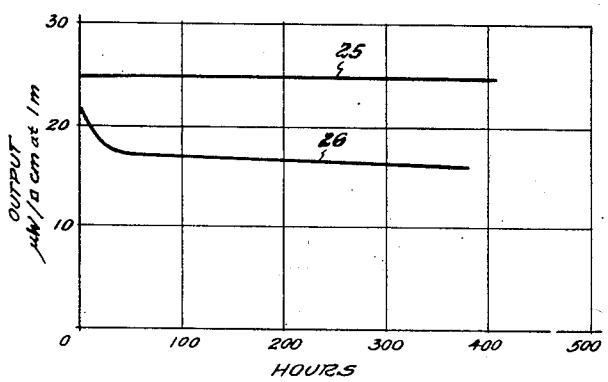
INVENTOR
H. C. RENTSCHLER.
BY
ATTORNEY Patented May 10, 1949

2,469,410

UNITED STATES PATENT OFFICE 2,469,410

ULTRAVIOLET LAMP

Harvey C. Rentschler, East Orange, N. J., assignor to Westinghouse Electric Corporation, East Pittsburgh, Pa., a corporation of Pennsylvania Application February 5, 1945, Serial No. 576,256

2 Claims. (Cl. 176—122)

This invention relates to discharge lamps and more particularly to such for the generation of ultra-violet radiations.

The principal object of my invention, generally considered, is to provide an ultra-violet lamp, the output of which does not fall off appreciably during life and which generates bactericidal radiations without an undesirable proportion of ozone-producing radiations.

Another object of my invention is to produce an efficient discharge lamp for generating bactericidal radiations without an appreciable falling off in output during life due to solarization.

A further object of my invention is to produce a germicidal lamp in which the envelope efficiently transmits bactericidal radiations, while at the same time absorbing most of the radiations below 2000 A. U., whereby the ozone produced is negligible.

A still further object of my invention is to produce an ultra-violet discharge lamp in which the ozone-producing effect may be kept in the desired range, by varying the thickness of the glass forming the envelope without undesirably changing the transmission of the bactericidal radiations.

Other objects and advantages of the invention will become apparent as the description proceeds.

Referring to the drawing:

Fig. 1 is an elevational view, partly in axial section, of an ultra-violet discharge lamp embodying my invention.

Fig. 2 is a chart showing the ratio between glass thickness and percentage transmission of the bactericidal and ozone-producing radiations.

Fig. 3 is a chart comparing the variation in output of a lamp embodying my invention, with that of a lamp similar thereto except that it has an envelope of glass such as formerly used for ultra-violet lamps.

When using an ultra-violet discharge lamp for the destruction of bacteria, we depend almost entirely upon the resonance radiation of mercury at about 2537 A. U. In generating such radiation by using mercury vapor, some of the energy produces radiations below 2000 A. U., which if not absorbed by the enclosing envelope are effective in producing ozone. For certain purposes, a small amount of ozone is desired, whereas for other purposes, it is necessary to reduce that generated to a negligible amount, or one which is almost undetectable.

It has been customary to use ultra-violet transmitting glass rather than quartz because, while the transmission of quartz for 2537 A. U. radiations is high, that for radiations shorter than 2000 A. U. is also relatively high, whereby excessive ozone is produced when using a quartz lamp. The transmission for 2537 A. U. radiations of the special ultra-violet glasses such as those sold under the trade-mark "Corex" and those having Corning Nos. 9740, 9741 and 972 is moderately good, say, from about 55% to 75% while the transmission for 2000 A. U. and shorter is considerably less than that for quartz, thus making possible a reasonable generation of 2537 A. U. radiation with only a moderate amount of ozone.

I have found that if the envelope of an ultra-violet discharge lamp is made of a good grade of Corning 96% silica glass, known by the trade name "Vycor," also called No. 791, and described on pages 304 and 305 of the article by Martin E. Nordberg, Journal of the American Ceramic Society, vol. 27, page 299, October 1944, the transmission for such glass one millimeter in thickness is in excess of 85% for 2537 A. U. radiation, with a very small transmission of ozone-producing radiations, that is, less than 1%, or about .5%. By using such a glass, therefore, I am able to obtain an output of bactericidal radiations practically equivalent to that obtainable when using quartz, and with a negligible, almost undetectable, generation of ozone. If the wall thickness of a "Vycor" envelope is double it still has a transmission of more than 72% for 2537 A. U., but only .0025% for ozone-producing radiations, assuming a .5% transmission for ozone-producing radiations when one millimeter thick. In other words, it is easy to maintain a large proportion of bactericidal radiations with the practical elimination of ozone.

As additional reason for using "Vycor," it is pointed out that common ultra-violet transmitting glasses, such as above referred to, solarize rapidly so that at the end of 50 to 100 hours the transmission for 2537 A. U. may be reduced by as much as 20%, with approximately the same percentage reduction in ozone-producing radiations. It is therefore evident that in order to produce a lamp with satisfactory initial emission of bactericidal ultra-violet radiations, which is maintained during life, glass for the envelope with such characteristics as "Vycor" is necessary.

Referring to the drawing, Fig. 1 illustrates a discharge lamp 11 of the gaseous-conduction type having an envelope 12 formed of 96% silica, or "Vycor" glass, which as beforementioned is a good transmitter of bactericidal ultra-violet radiations and a relatively poor transmitter of ozone-generating radiations. It is described in the above-referred-to publication as follows:

As shown on page 300 and in the first column of figures, Table I, page 301, this glass consists of approximately 96% SiO₂, 3% B₂O₃, and the balance Al₂O₃ with impurities including traces of Na₂O and As₂O₃. The density is 2.18 gm. per cc. The softening point is 1500° C., the annealing point 900° C., and the dielectric constant at 20° C. is 3.8. The electrical resistivity in ohms per cm. is given as—

Log R. at 250° C. _____ 9.7
Log R. at 350° C. _____ 8.1 and page 304:

"Vycor-brand glass No. 791 is produced for purposes requiring high transmission at wave lengths down to 254 mμ or less. Aside from transparency to ultraviolet light, the properties in general are identical to those of glass No. 790. it is regularly tested at 254 mμ and is guaranteed to have a transmission at this wave length of 70% for a thickness of 2 mm., but the transmission is usually higher than this. It should be pointed out that all values given in this section are for observed transmission uncorrected for reflection losses. The maximum possible transmission for zero light absorption in the glass is about 92%. The average transmission curve obtained on six samples taken from four random lots of No. 791 glass is shown in Fig. 5. The maximum deviation for individual samples was 1% for wave lengths down to 254 mμ. Samples were polished plates of 2 mm. thickness.

"The loss in transmission as a result of solarization is much less than for other commercially available ultraviolet-transmitting glasses except fused silica. In tests made from time to time by exposing polished plates under a 500-watt Hanovia quartz arc for 100 hours, the loss for a 2-mm. thickness at 254 mμ has averaged about 6% and has not exceeded 9% of the original value. Longer exposures have not increased this loss, indicating that the solarization was complete after 100 hours."

Electrodes 13 and 14 are disposed in said envelope, one at each end, respectively connecting with metallic contact caps 15 and 16 through conductive supports 17 and 18. These electrodes may be tubular, or of any desired configuration, and are constructed of a good conducting material such as iron, aluminum, or nickel, preferably nickel or Swedish iron, and desirably coated with electron-emission material.

An ionizable medium is introduced into the envelope and desirably consists of 60% neon and 40% argon at about 17 millimeters pressure and admixed with mercury vapor. The lamp may be any desired length, but is assumed to be approximately 30 inches long and about ½ inch diameter at the constricted, light-transmitting portion 19 which, at least, is formed of "Vycor." Such a lamp may be operated on a current of from about 40 to about 50 milliamperes under a potential of about 370 to 480 volts, depending upon whether coated or bare electrodes are used. It will therefore be seen that a lamp is of the same general character as, but has an enevelope different from that of, the lamp described and claimed in the James Patent No. 2,258,765, dated October 14, 1941.

Referring now to Fig. 2, there is shown plotted on semi-logarithmic paper, graphs illustrating the transmission of "Vycor" glass as compared with No. 9741 ultra-violet transmitting glass, both manufactured by Corning and the latter commonly used in the manufacture of ultra-violet lamps. The line 21 indicates that "Vycor" glass of one millimeter thickness has a transmission of 85%, said transmission decreasing to about 72% upon increasing the thickness to 2 millimeters. This same glass has an ultra-violet transmission of approximately 7% for ozone-generating radiations below 2000 A. U. when ½ millimeter thick, as indicated by the line 22, so that its transmission for glass one millimeter thick is only about .5%. When said glass is increased to 2 millimeters the transmission drops to .0025%.

These transmission lines are compared with dotted line 23 which shows the transmission of No. 9741 ultra-violet transmitting glass for 2537 A. U. radiation, that is, about 70%, when one millimeter thick, and line 24 which shows the transmission, that is about 2% when one millimeter thick, of 9741 glass for ozone-generating radiations. It will thus be seen that the "Vycor" glass is not only better than the glass previously employed for ultra-violet lamps, in that it more-efficiently transmits bactericidal radiations, but it more-efficiently excludes or absorbs the undesired ozone-producing radiations. It will be seen that by using heavy or thin walled tubing, the ozone-producing radiations passing through "Vycor" glass can be controlled with very little changing of the transmitted 2537 radiation. Even though different batches of such glass have different transmissions within limits, yet the ozone productions is still controllable by using the proper wall thickness of tubing produced from each batch.

As further illustrating the advantages of using "Vycor," as compared with previously used ultra-violet transmitting glasses, reference is had to Fig. 3 in which the curve 25 illustrates the bactericidal energy in micro-watts per sq. centimeter at one meter when using "Vycor" glass for the envelope of an ultra-violet discharge lamp. It will be seen that the output from such lamps throughout life is approximately uniform, with no appreciable falling off in transmission, as compared with the curve 26 in the same figure which indicates that in a short time solarization reduces the output from a lamp having 9741 U. V. transmitting glass to a very large extent.

In both instances, the lamps from which the data was obtained for the curves 25 and 26, were identical and as described in connection with Fig. 1, except for the glass forming the envelopes. That is, both were 30 inches long, had a gaseous filling of 60% neon, 40% argon at 17 millimeters pressure and admixed with mercury vapor. Both had electrodes of the same size and made of Swedish iron, and in both lamps, the current was maintained between 40½ and 42 milliamperes at a potential between 470 and 480 volts.

It is not known why there is practically no falling off in output from ultra-violet lamps having quartz envelopes, or such made of "Vycor" glass as indicated by the graph 25 in Fig. 3, while there is a large slump in output from lamps made of previously used glasses, such as Corning No. 9741, as represented by the graph 26 in the same figure. However, analysis indicates that while formerly-used ultra-violet transmitting glasses contain sodium, or other alkali metals, and manganese; quartz and "Vycor" are free from detectable amounts of alkali and have much less manganese than the other ultra-violet transmitting glasses.

It is, therefore, possible that the lower initial ultra-violet output and the large slump during the first 40 or 50 hours of operation of a lamp having Corning No. 9741, or other formerly-used ultraviolet transmitting glass, is due to the presence and solarization of the sodium or alkali compounds therein, while the continued slight falling off from thereon may be due to solarization of the manganese compounds. However, while this theory seems plausible, I do not wish to be limited thereto, as the main point is that lamps with "Vycor" envelopes and embodying my invention have excellent initial output and maintenance, whereas those made of ultra-violet transmitting glasses, in accordance with the teachings of the prior art, start lower and fall off in output severely during the first 50 hours of operation, and the output continues to fall off thereafter, but at a lesser rate, as compared with the practical freedom from loss of output due to solarization when using "Vycor" glass.

By using a higher pressure for the ionizable medium, that is, 17 millimeters, as compared with 8 millimeters pressure in accordance with the James Patent No. 2,258,765, previously referred to, I make it possible to use a higher discharge current without deleterious gas clean-up, to put relatively more power in the discharge for the same electrode power loss, as well as operate the lamp satisfactorily at lower temperatures.

Although a preferred embodiment of my invention has been described, it will be understood that modifications may be made within the spirit and scope of the appended claims.

I claim:

1. A discharge lamp comprising an envelope with a light-transmitting portion and enclosing a pair of spaced electrodes in a rare gaseous filling admixed with mercury vapor, the light-transmitting portion, at least, of said envelope being formed of ultra-violet transmitting glass known as "Vycor," consisting of approximately 96% $SiO_2$, 3% $B_2O_3$, and the balance $Al_2O_3$ with impurities including traces of $Na_2O$ and $As_2O_3$ which does not solarize substantially during the normal life of the lamp and which has a low transmission for ozone producing radiations.

2. A discharge lamp comprising an envelope enclosing an electrode in each end portion, the intermediate portion at least of said envelope being formed of ultra-violet transmitting glass known as "Vycor," consisting of approximately 96% $SiO_2$, 3% $B_2O_3$, and the balance $Al_2O_3$ with impurities including traces of $Na_2O$ and $As_2O_3$ and having a transmission for one millimeter thickness of about 85% for radiation of 2537 A. U. in the bactericidal band and about .5% for radiations in the ozone-producing band, and an ionizable medium comprising a rare gaseous filling at low pressure admixed with mercury vapor, said lamp being operable at low current density to produce ultra-violet radiations in both of said bands.

HARVEY C. RENTSCHLER.

REFERENCES CITED

The following references are of record in the file of this patent:

UNITED STATES PATENTS

| Number | Name | Date |
| --- | --- | --- |
| 1,971,309 | Fuwa | Aug. 21, 1934 |
| 2,025,182 | Sperti | Dec. 24, 1935 |
| 2,116,742 | Elenbaas | May 10, 1938 |
| 2,152,994 | Hanlein | Apr. 4, 1939 |
| 2,196,567 | Sperti | Apr. 9, 1940 |
| 2,240,352 | Schmidt | Apr. 29, 1941 |
| 2,258,765 | James | Oct. 14, 1941 |
| 2,286,275 | Hood | June 16, 1942 |
| 2,362,385 | Libby | Nov. 7, 1944 |

FOREIGN PATENTS

| Number | Country | Date |
| --- | --- | --- |
| 498,177 | Great Britain | Jan. 4, 1939 |